Patented May 31, 1932

1,860,478

UNITED STATES PATENT OFFICE

EUGEN ROMIG AND KARL HOLZACH, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

DYESTUFFS OF THE TARTRAZINE SERIES

No Drawing. Application filed October 10, 1930, Serial No. 487,899, and in Germany October 22, 1929.

The present invention relates to new dyestuffs of the tartrazine series and process of producing the same.

We have found that the dyestuffs of the tartrazine series corresponding to the general formula:

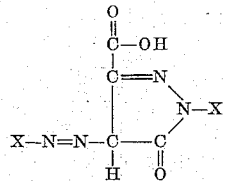

in which X stands for the radicle

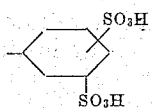

which may be further substituted are valuable dyestuffs in view of the particularly greenish yellow shades obtained therewith. This valuable property is especially remarkable with the dyestuffs of the said kind in which the second sulphuric acid groups in the phenyl radicles are attached to the 2- or 3-positions, or to the 4-positions in case the phenyl radicle contains a methyl group. In view of their shades and their fastness to water they are particularly suitable for printing on paper and similar substrate, that is for graphic printing purposes. In addition thereto the new dyestuffs have other valuable properties. Thus the dyestuff containing a 2-methylphenyl-4.5-disulphonic acid radicle in the form of its colour lakes is particularly suitable for the wall paper industry, and these colour lakes have the further advantage of being fast to overprinting. On the other hand, the dyestuff containing a phenyl-3.5-disulphonic acid radicle and still more that containing a phenyl-2.5-disulphonic acid radicle are particularly fast to light and are therefore most suitable for dyeing wool.

The preparation of these new dyestuffs is carried out by condensing 1 molecular proportion of sodium dihydroxy-tartrate with 2 molecular proportions of a phenyl hydrazine-5-sulphonic acid containing a further sulpho group preferably in the 2- or 3-position, or by coupling a pyrazolone carboxylic acid or an alkyl ester thereof obtainable in the manner already known from oxalacetic ester by condensation with 1 molecular proportion of a phenyl hydrazine disulphonic acid, with a phenyl diazonium compound containing 2 sulpho groups, the reacting components being chosen that one of the sulpho groups is present in the 5-position of the phenyl radicles. The resulting dyestuffs, in spite of the numerous sulphonic acid groups present in the molecule, may be readily salted out from their solutions.

The colour lakes of the dyestuffs are obtainable according to known methods by precipitating the dissolved dyestuffs by means of salts of the alkaline earth metals.

The following examples will further illustrate the nature of this invention, but the invention is not restricted to these examples. The parts are by weight.

Example 1

100 parts of sodium dihydroxy-tartrate are stirred into 198 parts of phenyl hydrazine-3.5-disulphonic acid in the form of an approximately 20 per cent paste. The mixture is then heated at 50° C. until the whole has gone into solution giving a yellow colouration. The temperature of the solution is then raised to 80° C., the solution is rendered alkaline with soda and the dyestuff formed is precipitated with common salt and isolated in the usual manner. The dyestuff dyes wool very greenish yellow shades having excellent fastness to light and may be converted into colour lakes having an excellent covering power by treatment with metal salts and the like.

Example 2

The same dyestuff as is described in Example 1 is obtained by coupling in aqueous solution 145 parts of the 1-(phenyl-3'.5'-disulphonic acid)-5-pyrazolone-3-carboxylic acid (prepared by condensation of oxalacetic ethyl ester with phenyl hydrazine-3.5-disulphonic acid and saponifying the product) with the diazonium compound prepared in the usual manner from 100 parts of aniline-3.5-disulphonic acid. The resulting dyestuff is isolated in the usual manner by salting out.

A similar dyestuff is obtained by employing in the aforedescribed reaction the 1-(phenyl-3'.5'-disulphonic acid)-5-pyrazolone-3-carboxylic acid ethyl ester.

Example 3

198 parts of phenyl hydrazine-2.5-disulphonic acid are stirred into 2000 parts of 25 per cent sulphuric acid and are heated to 95° C. At the same temperature, 100 parts of sodium dihydroxy-tartrate are slowly introduced into the solution, the solution is kept at 95° C. for some hours and the resulting dyestuff is salted out in the usual manner. The precipitated dyestuff is worked up in the usual manner. The dyestuff obtained has similar properties to the dyestuff described in Example 1.

Example 4

145 parts of the 1-(phenyl-2'.5'-disulphonic acid)-5-pyrazolone-3-carboxylic acid, prepared in the manner already known from oxalacetic ethyl ester by condensation with phenyl hydrazine-2.5-disulphonic acid and saponification, are coupled in aqueous solution with the diazonium compound obtained in the usual manner from 100 parts of aniline-2.5-disulphonic acid. The resulting dyestuff is identical with that obtained according to Example 3. The dyestuff is isolated in the usual manner by salting out.

A similar dyestuff is obtained by the employment of the unsaponified condensation product of phenyl hydrazine-2.5-disulphonic acid and oxalacetic ethyl ester.

Example 5

Colour lakes of the dyestuff described in the foregoing examples may be prepared as follows:—

20 parts of aluminium sulphate containing 18 per. cent of aluminium oxide are dissolved in 200 parts of water and mixed with a solution of 10 parts of calcined soda in 100 parts of water. The precipitate is washed with water after decanting and mixed with a solution of 3.5 parts of stannic chloride in 35 parts of water and boiled for ½ hour. Thereupon, 4 parts of a dyestuff in 200 parts of water are added and 10 per cent solutions of 8.5 parts of barium chloride, 4.4 parts of aluminium sulphate and 2.5 parts of calcined soda are introduced one after the other into the mixture. The precipitate is then filtered off, pressed, dried and ground.

What we claim is:—

1. As new articles of manufacture dyestuffs of the tartrazine series corresponding to the general formula:

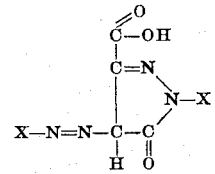

in which X stands for the radicle:

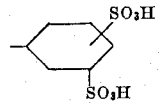

which may be further substituted by a methyl group, and in which the hydrogen atoms of the acid groups may be replaced by ions of an alkaline earth metal.

2. As a new article of manufacture the dyestuff of the tartrazine series corresponding to the formula:

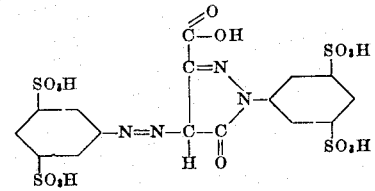

dyeing wool greenish yellow shades.

3. As a new article of manufacture the dyestuff of the tartrazine series corresponding to the formula:

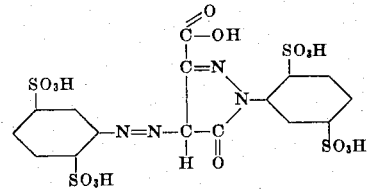

dyeing wool greenish yellow shades.

In testimony whereof we have hereunto set our hands.

EUGEN ROMIG.
KARL HOLZACH.